(12) United States Patent
Chopard et al.

(10) Patent No.: US 11,165,111 B2
(45) Date of Patent: Nov. 2, 2021

(54) THERMAL BARRIER, IN PARTICULAR FOR A BATTERY OR BATTERIES THUS EQUIPPED

(71) Applicant: Hutchinson, Paris (FR)

(72) Inventors: Fabrice Chopard, Saint Martin d'Heres (FR); Cédric Huillet, Montargis (FR); Fanny Geffray, Rennes (FR); Dragisa Jovanovic, Paris (FR)

(73) Assignee: Hutchinson, Paris (FR)

( * ) Notice: Subject to any disclaimer, the term of this patent is extended or adjusted under 35 U.S.C. 154(b) by 215 days.

(21) Appl. No.: 16/083,775

(22) PCT Filed: Mar. 9, 2017

(86) PCT No.: PCT/FR2017/050538
§ 371 (c)(1),
(2) Date: Sep. 10, 2018

(87) PCT Pub. No.: WO2017/153691
PCT Pub. Date: Sep. 14, 2017

(65) Prior Publication Data
US 2019/0131675 A1    May 2, 2019

(30) Foreign Application Priority Data
Mar. 11, 2016  (FR) .................... 1652072

(51) Int. Cl.
*H01M 10/659*     (2014.01)
*F28D 20/02*      (2006.01)
*H01M 50/24*      (2021.01)

(52) U.S. Cl.
CPC ........ *H01M 10/659* (2015.04); *F28D 20/026* (2013.01); *H01M 50/24* (2021.01); *F28F 2270/00* (2013.01); *Y02E 60/14* (2013.01)

(58) Field of Classification Search
CPC ........... F28F 2013/005; F28F 2013/006; F28F 2013/008; F28F 2270/00; F28F 2265/10; F28D 20/026; H01M 10/659; H01M 2/1094; H01M 2/0277; H01M 2/0482; H01M 10/60; H01M 10/667; B32B 5/022; B32B 5/24; B32B 5/245; B32B 25/04; B32B 25/045; B32B 25/10;
(Continued)

(56) References Cited

U.S. PATENT DOCUMENTS 2,364,144 A * 12/1944 Hunsaker .......... H01M 10/6563
                                                   454/239
3,531,752 A *  9/1970 Gourley .................. F28F 13/00
                                                   337/139
(Continued)

FOREIGN PATENT DOCUMENTS

DE    10 2011 086 799 A1    5/2013
EP          2 540 925 A1    1/2013
(Continued)

*Primary Examiner* — Jianying C Atkisson
*Assistant Examiner* — Jose O Class-Quinones
(74) *Attorney, Agent, or Firm* — Blank Rome LLP

(57) ABSTRACT

A thermal barrier to maintain the temperature of a battery. The barrier includes elements with respectively cold and hot PCM materials, and elements, thermal isolators, arranged at least in case of some between two of the PCM material elements.

18 Claims, 8 Drawing Sheets

(58) Field of Classification Search
CPC .......... B32B 2250/40; B32B 1207/304; B32B 2391/00; B60L 58/24
See application file for complete search history.

(56) References Cited

U.S. PATENT DOCUMENTS

| | | | | |
|---|---|---|---|---|
| 4,213,448 A * | 7/1980 | Hebert | ................ | F24S 60/00 126/589 |
| 4,482,010 A * | 11/1984 | Cordon | ................ | F24F 5/0021 165/10 |
| 4,581,285 A * | 4/1986 | Mahefkey, Jr. | ........ | B32B 15/08 442/378 |
| 5,449,571 A * | 9/1995 | Longardner | ........ | H01M 2/0237 429/120 |
| 5,532,039 A * | 7/1996 | Payne | ................ | B32B 3/12 428/116 |
| 5,549,153 A * | 8/1996 | Baruschke | ........ | B60H 1/00278 165/42 |
| 5,722,482 A * | 3/1998 | Buckley | ................ | A41D 31/065 165/10 |
| 5,927,381 A * | 7/1999 | Bednarek | ........ | B60H 1/00492 165/41 |
| 2004/0231355 A1 * | 11/2004 | Mayer | ................ | F25D 3/06 62/371 |
| 2005/0178524 A1 | 8/2005 | Pause | | |
| 2008/0233368 A1 * | 9/2008 | Hartmann | ........ | D06M 23/12 428/206 |
| 2010/0273041 A1 * | 10/2010 | Lawall | ................ | H01M 10/659 429/120 |
| 2011/0120040 A1 * | 5/2011 | Alderman | ........ | E04B 9/001 52/309.13 |
| 2011/0147391 A1 * | 6/2011 | Corder | ................ | F28D 20/02 220/592.27 |
| 2012/0305435 A1 * | 12/2012 | Matta | ................ | B65D 81/3862 206/521 |
| 2013/0221013 A1 * | 8/2013 | Kolowich | ........ | A47J 36/2444 220/592.17 |
| 2014/0017118 A1 * | 1/2014 | Stoddard | ........ | H01M 10/623 422/1 |
| 2014/0106198 A1 * | 4/2014 | Guha | ................ | H01M 10/658 429/120 |
| 2014/0138042 A1 * | 5/2014 | Yagi | ................ | H01M 10/663 165/10 |
| 2014/0154539 A1 * | 6/2014 | Kwok | ................ | H01M 10/643 429/82 |
| 2014/0327396 A1 | 11/2014 | Rejman et al. | | |
| 2014/0335382 A1 * | 11/2014 | Balandin | ........ | H01M 10/6551 429/50 |
| 2015/0121939 A1 * | 5/2015 | Takeuchi | ........ | F25B 13/00 62/324.6 |
| 2015/0280295 A1 * | 10/2015 | Bhunia | ........ | H01M 2/1077 429/50 |
| 2016/0112050 A1 * | 4/2016 | Gotsmann | ........ | F28F 13/00 331/66 |
| 2016/0226111 A1 * | 8/2016 | Blume | ........ | H01M 10/613 |

FOREIGN PATENT DOCUMENTS

| | | |
|---|---|---|
| WO | WO-01/61778 A2 | 8/2001 |
| WO | WO-2008/011540 A2 | 1/2008 |
| WO | WO-2011/116076 A1 | 9/2011 |
| WO | WO-2012/170691 A2 | 12/2012 |
| WO | WO-2013/040404 A2 | 3/2013 |

* cited by examiner

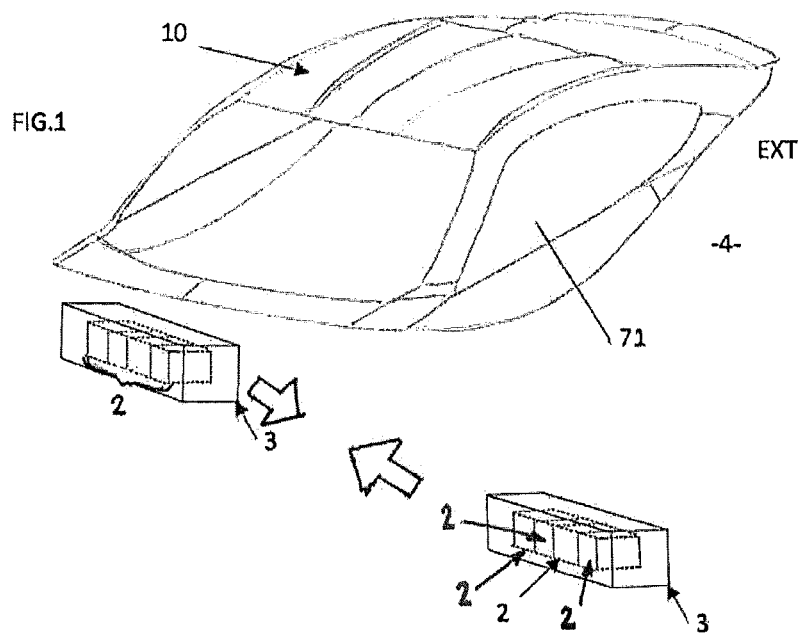
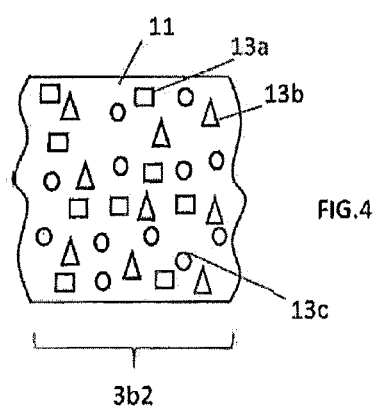

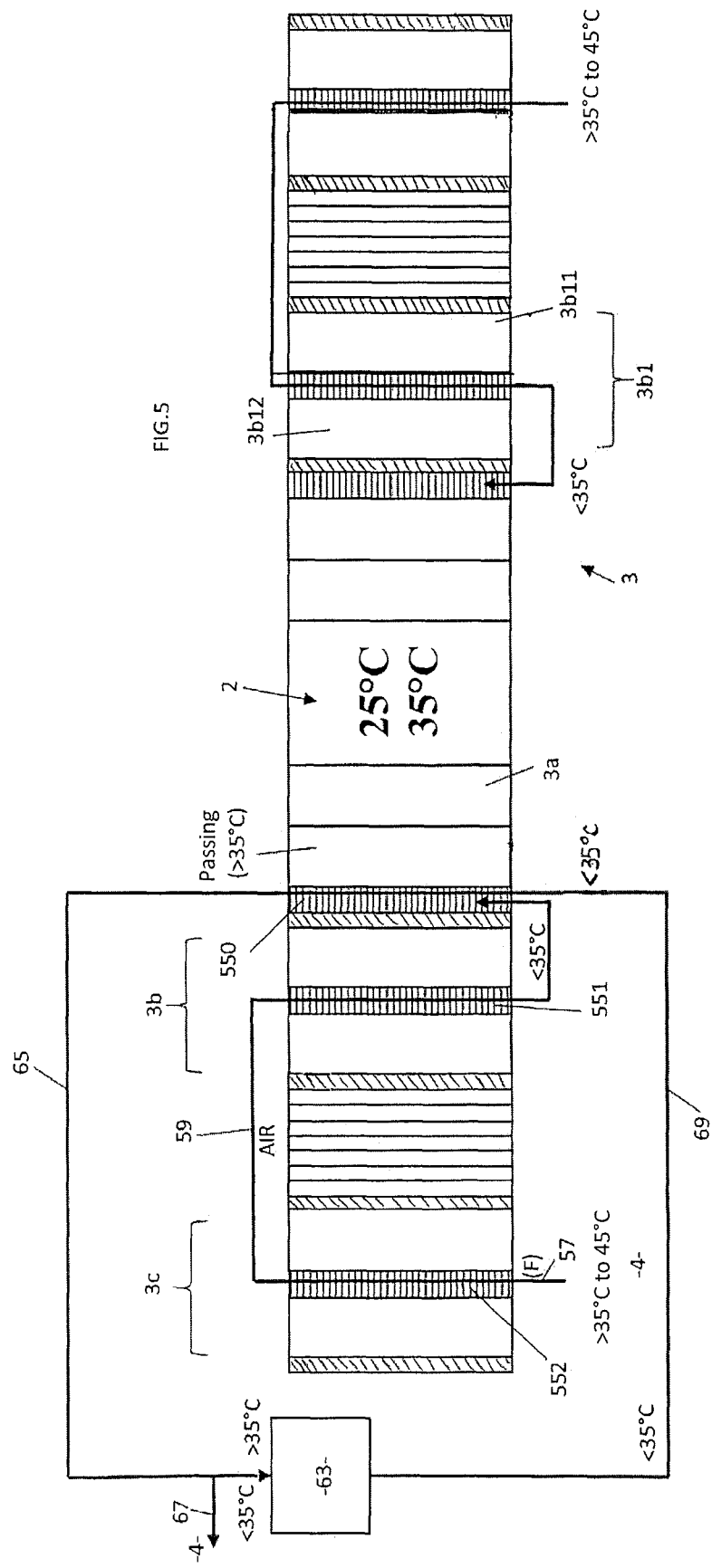

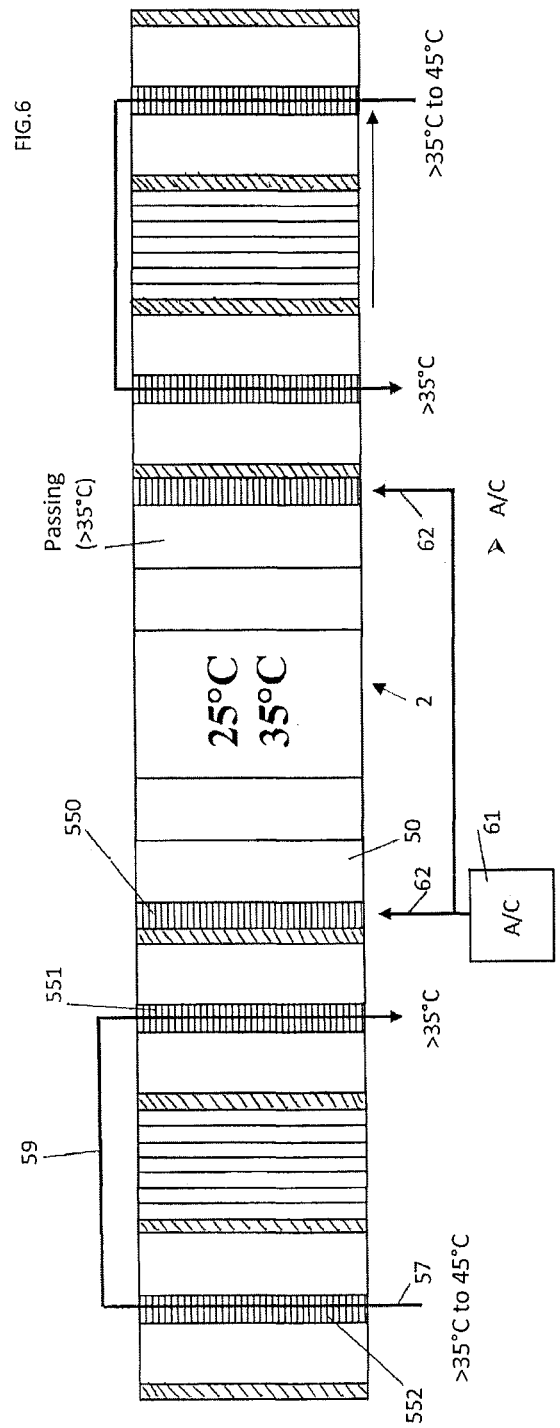

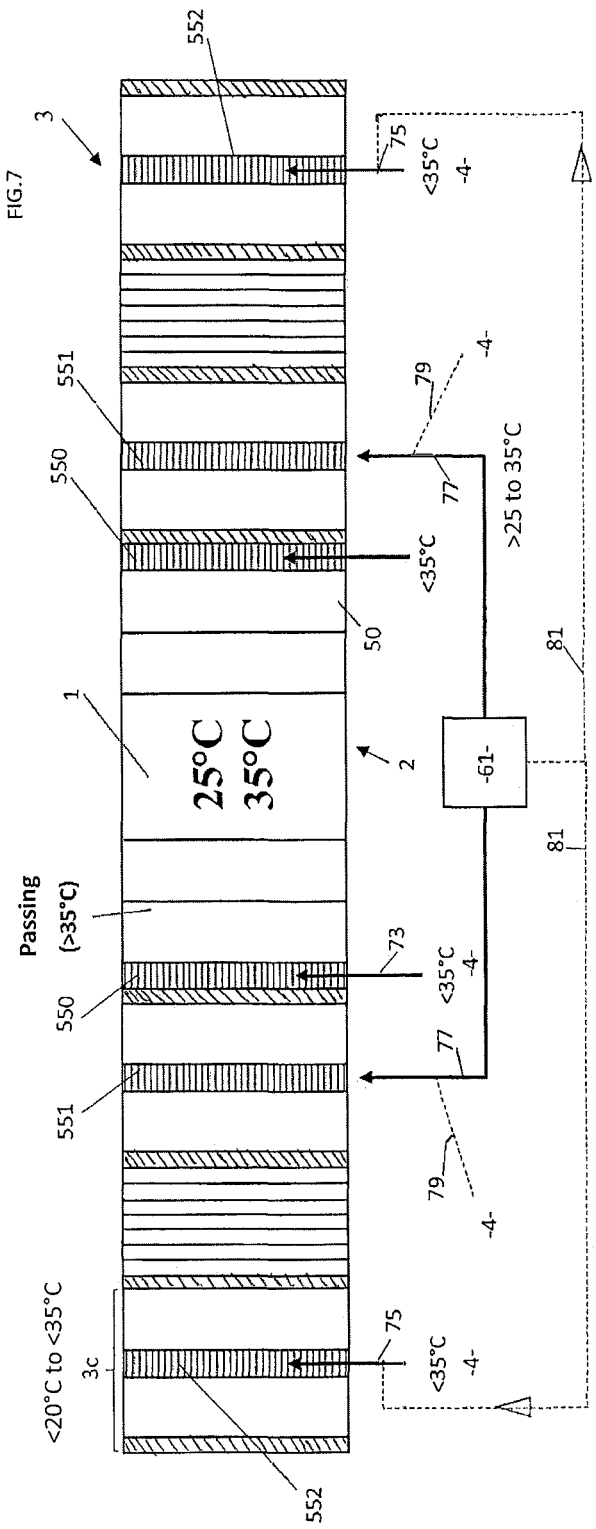

THERMAL BARRIER, IN PARTICULAR FOR A BATTERY OR BATTERIES THUS EQUIPPED

The present invention relates to the field of thermal management.

It relates, in particular, to an assembly comprising a thermal management device (also known as a barrier), which in principle functions passively, in order to encourage, within an internal volume and/or with respect to a temporary heat-producing element arranged therein, maintenance of a temperature within a predetermined range.

This applies in particular to electrical installations that increase in temperature, such as electric storage batteries.

In a battery, or a series of batteries assembled in series or in parallel, it may be highly useful to be able to control the operating temperature of the cells which increase in temperature when producing electricity.

Within this context, it is acknowledged that it may be useful to be able to both insulate said volume and/or its contents from the external environment and even more finely manage the temperature therein within operational margins and to delay propagation of a disturbing heat flow towards this volume and/or to even the temperature in said volume or in at least part of a wall with which it may be in contact.

It is in this context that an assembly is proposed, comprising as foresaid, a thermal management device, said assembly being characterised in that it comprises:
said internal volume,
said device, arranged around the internal volume and placed in an external environment and subject to temperatures included between temperatures respectively lower than and higher than said predetermined range, wherein the device comprises at least one thermally insulating element interposed between the internal volume and the external environment and from the inside, where said internal volume is located and/or the element arranged therein, towards the outside:
at least one first PCM material having a change of state between liquid and solid, wherein each first PCM material has a change-of-state temperature less than or equal to the lowest temperature of said predetermined range, intended, by change of state, to:
yield heat by crystallising, thereby delaying propagation of cold from the external environment towards the internal volume,
and absorb heat by liquefying under the influence of the heat produced by said heat-producing element,
at least one first PCM material having a change of state between liquid and solid, wherein each second PCM material has a change-of-state temperature greater than or equal to the highest temperature of said predetermined range, intended, by change of state, to:
absorb heat energy by liquefying (at a temperature greater than or equal to said highest temperature of the predetermined range), thereby delaying propagation of the heat energy from the external environment towards the internal volume,
and release stored heat energy, by crystallising, typically when the external environment temperature is less than the (their) change-of-state temperature.

In practice, the aforesaid device will define a wall around at least a part of said internal volume and will be incorporated in a "base" wall (for structural purposes) or will line the latter.

The term "surrounded" or "around" is to be understood as meaning an element (wall, device . . . ) limiting the internal volume at least locally, on one side or on one face for example. Hence, said internal volume will not necessarily be completely surrounded by this element.

Thermally insulating materials serve to limit heat exchanges between the inside and outside. In addition, a PCM enables smoothing of the temperature peaks for example throughout the day or even the year and/or intervene at the moment when a temperature is reached. An interior to be protected may therefore be less warm in the daytime, during hot weather and less cold at night, during cold weather.

Combining the two therefore makes sense, all the more so, even if this principle becomes more complicated, when there is a need to thermally manage a space in which the temperature may vary and which must be installed in a difficult environment, with temperature gradients that can possibly reach several tens of ° C.

Combining thermal insulation with a complex of hot PCMs (second PCM material) and cold PCMs (first PCM material) should be effective with respect to the objectives sought.

For the performance of the thermal insulation, it is recommended that said at least one thermally insulating element be arranged in a vacuum enclosure, in order to define at least one controlled atmosphere insulating panel, VIP, preferably also accommodating at least a part of the PCM materials.

These VIP panels will define fairly rigid structures, even if they are packed in such a way as to include at least one closed, sealed enclosure consisting of at least one deformable sheet.

In order to structure said first and second PCM materials, it is furthermore recommended to include the latter, from the inside towards the outside, in:
optionally a first element containing at least one second PCM material,
a second element containing several first PCM materials,
a third element containing at least one second PCM material.

In contrast to the aforesaid rather rigid VIP structures, the first element containing at least one PCM material will preferably define a deformable layer adapted to absorb deformation of the heat production means and to even out any hot spots which they may have caused.

It may in fact occur that local hot spots are created by the heat production means, or also at least in case of a battery, for example in a pouch cell battery, management of the problem of deformation of certain means is required.

Again for the performance of the thermal insulation, it is recommended, in total or partial combination if necessary:
for each insulating element to contain a porous material,
for said first and/or second PCM material(s) to include individually (one, the other or both) several PCM materials with different change-of-state temperatures, thereby graduating the effects,
for said at least one thermally insulating element to be interposed between the first and second PCM material(s), with an enhanced protective effect,
for said device to include several said thermally insulating elements arranged at several of the following points:
between two of the first, second and third elements,
outside said third element (the PCM blocks will thus be dissociated and circulation of the flows between two of such blocks will be inhibited or delayed), for, from the inside towards the outside, the PCM materials of the second and/or third elements to have increasing change-of-state temperatures, thereby encouraging stratified thermal management and thus improving the efficiency of this management.

Among the difficulties of thermal management, there is also that of evacuating the energy stored in the element or each element containing a PCM.

In order to contribute to implementing a relevant solution, it is proposed here that at least one of the second and third elements should be crossed by fluid circulation channels, in thermal exchange with the PCM material(s).

Using air and even more so under natural convection, will furthermore achieve the aim of passive operation of the thermal barrier.

Within heat production means, it may moreover occur that the temperatures tend towards the limits at certain times, without exceeding the latter, so that it may be appropriate to initiate intervention of the second and third elements containing a PCM only beyond certain operating conditions.

It is therefore proposed that the barrier should also include a thermal switch arranged between said first and second elements. A thermal switch is a selective thermal linking member. The switch has poor heat conduction for as long as it is not activated (for example, thermal conductivity typically included between 0.1 mW/m·K and 0.5 W/m·K at 20° C. and at atmospheric pressure). When the thermal switch is activated, it becomes a good heat conductor (for example included between 1 and 10 W/m·K).

Additionally, in order the supplement such a capacity to manage control of the temperatures immediately close to the normal operating range in the innermost layers of the barrier, it is proposed that, from the inside towards outside, between the thermal switch and the second element containing a PCM material, a space is interposed, crossed by fluid circulation channels and at least one said thermally insulating element.

Isolating the warm PCMs from the cold PCMs will promote the desired barrier effects in addition to the capacities of these PCMs to regenerate by returning to a state where they can once absorb energy.

Thus it is recommended:

that several said fourth elements be provided, thermal insulators interposed individually between the first and second elements containing a PCM material and between the second and third elements containing a PCM material, and likewise outside said third element, and/or that the second element containing a PCM material comprises several layers of material, each containing a PCM material and individually having change-of-state temperatures different from one another, with one of the fourth elements, thermal insulator, being interposed between two said layers.

Furthermore, the barrier effects will also be promoted if at least one of the second and third elements comprises several dispersed PCM materials or several layers of material, each containing a PCM material, with said PCM materials having change-of-state temperatures different from one another.

Among said means of heat production, of particular importance is the case in which they comprise cells of an electric battery, or a series of batteries assembled in series or in parallel, producing heat.

In this case, thermal management of the cells, or of the batteries in general, will be favourably ensured overall by a form of peripheral enclosure provided for said device and preferably having, as the predetermined temperature range for, to be maintained, between 25 and 35° C. for prismatic cells and between 45° C. and 55° C. for "pouch cells", all to within 5° C.

Specifically, in the application of electric battery or batteries, it is furthermore recommended:

that the change-of-state temperature of the coldest PCM be between 25° C. and −30° C., preferably between 20° C. and −20° C., and that of the warmest PCM, located in the last outermost layer, be between 30° C. and 55° C., preferably between 40° C. and 45° C.

In this manner, it will be possible to tend towards a form of operation in which, regardless of the external conditions encountered, typically between −20° C. (winter/cold) and 45° C. (summer/warm) and for a period of time of 8 to 15 hours, it will be possible to maintain a battery placed in a vehicle at an internal temperature within the aforesaid range(s), using existing PCMs and with an overall thickness of layers containing PCM of a few mm to a maximum of a few tens of mm and for example 2 to 10 successive layers of cold and hot PCMs, respectively, or the equivalent with dispersed PCMs.

Thus, it will be possible to thermally manage evolution over time of electrolytes, anodes and/or cathodes in a batch of cells of a vehicle battery pack, or even other electrical installations in order to improve the service life and efficiency of the energy production system.

BRIEF DESCRIPTION OF THE DRAWINGS

If necessary, the invention will be better understood and other characteristics, details and advantages thereof will become apparent upon reading the following description as a non-exhaustive example with reference to the appended drawings in which:

FIG. 1 outlines the installation of one or more thermally managed batteries on a vehicle moving under the power of at least one internal combustion engine or electric motor;

FIG. 4 outlines dispersion of several PCMs in a support matrix;

FIGS. 5-8 outline fluidic circuits that can play a role in improved thermal management;

Figure 9:
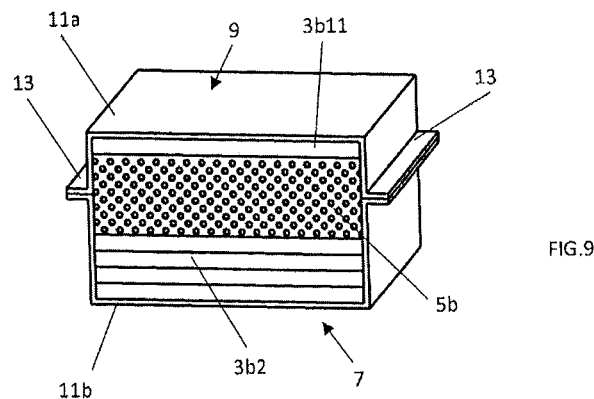
Figure 10:
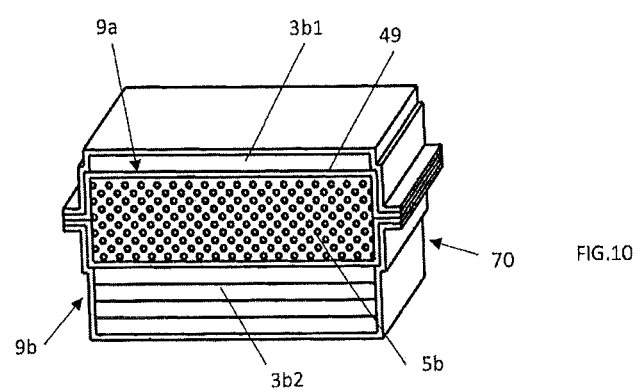

Finally, FIGS. 9-10 outline two means of jointly packing PCMs and a thermal isolator.

DETAILED DESCRIPTION

With regard to the sections in FIGS. 2 and 5-8, they must be understood as implying that the wall or barrier will favourably extend around the whole of the volume 1.

For all purposes, it is furthermore confirmed that a phase-change material—or PCM—denotes in this case a material capable of changing physical state, between solid and liquid, within a restricted temperature range of between −25° C. and 50° C., or indeed between −35° C. and 60° C. The heat transfer (or thermal transfer) can be achieved by using the Latent Heat (LH) thereof: the material can then store or transfer energy by change of state, while maintaining a substantially constant temperature, that of the change of state.

The thermally insulating material(s) associated with the PCMs may consist of a "simple" insulator, such as glass wool, but a foam will certainly be preferred, for example made of polyurethane or polyisocyanurate, or even more favourably, a porous, or indeed nanoporous, thermally insulating material, arranged in a vacuum enclosure, in order to define at least one vacuum insulated panel, VIP.

"VIP" means a "controlled atmosphere" structure, i.e. either filled with a gas having a thermal conductivity lower than that of the ambient air (26 mW/m·K) or "under vacuum", i.e. under a pressure lower than the ambient pressure (therefore <105 Pa). A pressure between 100 Pa and 104 Pa inside the enclosure may, in particular, be suitable. The enclosure may contain at least one thermally insulating material that is in principle porous (pore sizes less than 1 micron). In this case, the performance of the thermal management to be ensured will be further improved, or even the overall weight decreased with respect to another insulator. Typically, the VIP panels are thermal insulators in which at least one porous material, for example silica gel or silicic acid powder (SiO2), is pressed into a plate and each surrounded, under partial air vacuum, by a gas-tight wrapping foil, for example plastic and/or roll-formed aluminium. The resulting vacuum typically lowers the thermal conductivity to less than about 0.01/0.020 W/m·K under the conditions of use. A 3 to 10-fold greater insulation efficiency than that of more conventional insulating materials is thus achieved.

"Porous" designates a material having interstices enabling the passage of air. Open-cell porous materials thus include foams but also fibrous materials (such as glass wool or rock wool). The passage interstices that can be qualified as pores have sizes less than 1 or 2 mm so as to be able to guarantee a good thermal insulation, and preferably less than 1 micron, and more preferably less than 1 to 2×10−8 m (virtually nanoporous structure), in particular for questions of resistance to ageing and therefore possible lower negative pressure in the VIP enclosure.

"Conformable" means a structure that can be deformed, for example bent, by hand. "Sealable" refers to a weldable connection, notably heat-sealable, or even solderable, particularly with sheets or films (thinner).

This being clarified, the following will deal by way of a privileged example with the case of a storage battery pack globally surrounded by a thermal barrier fulfilling all or some of the above characteristics.

In this "battery or batteries" application (as an example of an electrical installation that can benefit from the thermal barrier presented here), the invention therefore proposes, regardless of a certain degree of the external conditions (hot or cold), to participate in maintaining the pack of cells or batteries concerned within an optimal temperature range, based on a passive system.

Thus, the proposed solution is preferentially designed in this case to operate without any external hot or cold energy supply (to the battery), or drawing of electrical energy produced by the battery and to be light and space-saving, hence the "passive" nature of the thermal management performed.

Figure 2:
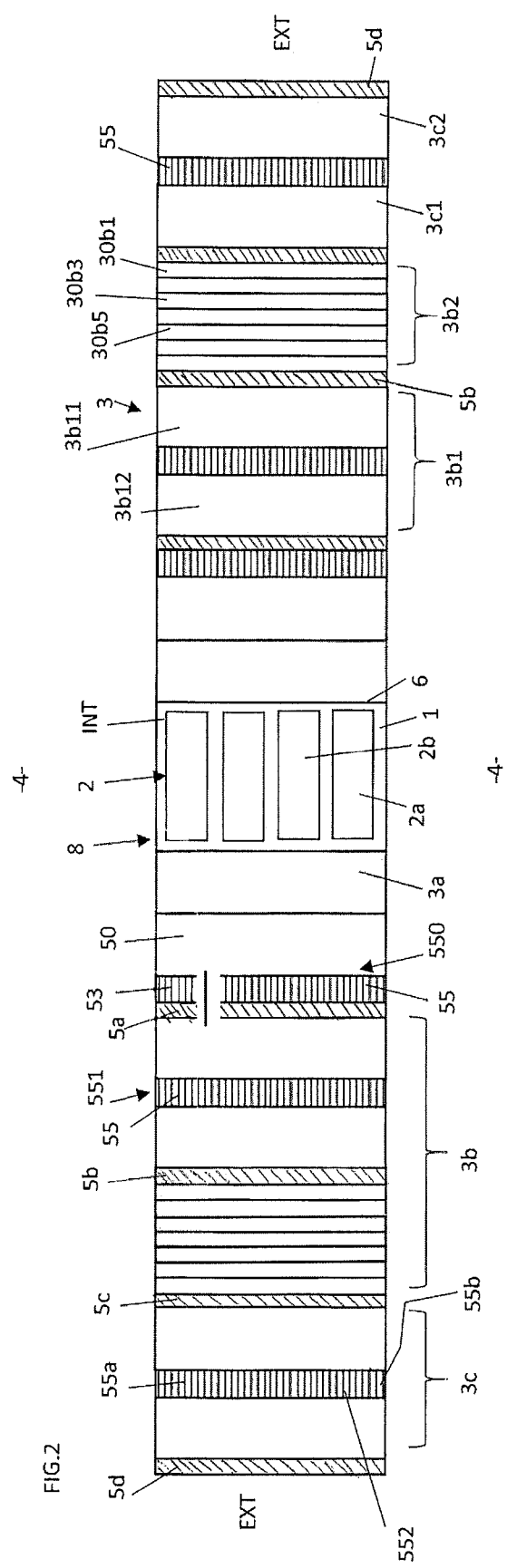
FIG. 2 illustrates in further detail the thermal management scheme of one or more such batteries.

In particular, FIGS. 1,2 show the principle of the solution developed, in the non-limiting example of thermal management of a storage battery.

A series of cells 2a,2b . . . of a single battery 2 or several such batteries 2 are arranged in a central volume 1 to be protected, as outlined in FIG. 2. The difference lies in that the thermal management device, or thermal barrier 3, will be, in the vehicle:

either individual: one thermal barrier 3 per battery, which is electrically connected to the outside (solution on the left in FIG. 1), or global: a thermal barrier 3 surrounding the whole set of batteries, each electrically connected to the outside (solution on the right in FIG. 1).

The battery/each battery is prismatic in the example and therefore with a predetermined range of temperatures to be maintained therein assumed to be between 25° C. and 35° C., to within 5° C.

These accumulator cells increase in temperature when they generate electricity. Each cell comprises a central volume enclosing an electrolyte, an anode and a cathode, all inside an enclosure which can comprise a layer of PCM having a melting temperature of approximately 35° C. and a layer of thermal insulator placed under partial air vacuum, forming a VIP structure.

The volume 1 is surrounded by a thermal management device, or thermal barrier, 3.

Typically, the barrier 3 surrounding the battery 2 will be arranged on board a vehicle 10, such as an automobile, or even a boat or other. Thus, the environment 4 to which the barrier 3 will be subject will be that encountered by the vehicle wherever the user uses it.

The aim is to maintain the temperature of, or in, the volume 1 within a predetermined range, while the barrier 3 is placed in this external environment 4 which may therefore be at non-constant temperature.

To this end, the barrier 3 comprises at least:

from the interior (INT), where thermal exchange occurs with the internal volume 1 or the means arranged therein (battery in this case), towards the exterior (EXT):

a first element 3a containing at least one PCM material storing or releasing thermal energy by change of state and having a first change-of-state temperature (T1; hereinafter hot PCM), a second element 3b containing at least one PCM material (hereinafter cold PCM), having a second change-of-state temperature (T2), lower than the first, a third element 3c containing at least one PCM material (hereinafter once again hot PCM), having a third change-of-state temperature (T3), higher than the second (T2), and at least one fourth element, thermal insulator (5a,5b, 5c,5d), arranged:

between two of the first, second and third elements containing a PCM material, and outside said third element (3c).

The fourth thermally insulating element 5a-5d and in practice each thereof will favourably comprise a porous, or even nanoporous, insulating material conditioned as a VIP panel.

In addition, the elements 3a-3c will contain (at least) one PCM material in the sense that they will or will not be produced solely using a pure material or more probably mixed in a matrix, with fillers. A rubber compound as described in EP2690137 or in EP2690141 may be provided as a structure of one at least of these elements 3a-3c, i.e. in the second case a cross-linked compound based on at least one room temperature vulcanised (RTV) silicone elastomer and comprising at least one PCM material, said at least one silicone elastomer having a viscosity measured at 23° C. according to standard ISO 3219 that is less than or equal to 5000 mPa·s. In this case, the elastomer matrix will mainly consist (i.e. based on an amount greater than 50 phr, preferably greater than 75 phr) of one or several "RTV" silicone elastomers. The thermal PCM material may consist of n-hexadecane, eicosane or a lithium salt, all having melting points below 40° C.

The other (or at least another) of these elements may be based on paraffin, eutectic fatty acid (myristic-capric) or eutectic hydrated salt (calcium chloride+potassium). There are other possibilities, such as a PCM impregnated in a porous network.

In order to optimally promote thermal preservations of the battery, it is advisable to divide all or some of the PCM elements into several sublayers. Hence, it is preferable:

that one at least and in this case both, second and third elements ($3b$, $3c$) should comprise several sublayers of material, each containing a PCM material, such as the sublayers respectively $30b1,30b3,30b5$ and $3c1,3c2$ individually having change-of-state temperatures different from one another, and even that for one at least of the two said second and third elements ($3b2,3c$), these change-of-state temperatures should increase from the first innermost sublayer to the last outermost sublayer.

In this second case, the advantage of providing for increasing change-of-state temperatures will lie in staggering the anticipated thermal barrier effects.

Thus, it is possible to provide:

at least two layers $3c1,3c2$ for the outermost hot PCM protective element, with therefore two change-of-state temperatures, for example one, lower, melting temperature Tf1=35° C. for the innermost layer $3c1$ and another, higher, Tf2=40° C. for the outermost layer $3c2$;

more than two layers, for example ten layers, $30b1$ . . . $30b3$, with therefore as many change-of-state temperatures (in this case, crystallisation Tci), staggered for example in 5° C. increments, between −20° C. (outermost layer) and 25° C. (innermost layer), for the outermost sub-block $3b2$ of the two ($3b1,3b2$) of the element based on cold PCMs $3b$, and two layers separated by one of the spaces 53 with channels 55, for the other sub-block $3b1$ (the innermost of the two), with on the other hand preferably the same change-of-state temperature for the two layers of the sub-block $3b1$; typically crystallised state at 25° C. and below.

In practice, it is probable that this concept of successive "layers" will be materialised by the presence of several PCM materials dispersed in a matrix, with said PCM materials having mutually different change-of-state temperatures, staggered according to needs. Thus, outlined in FIG. 4 is a layer, such as a layer $3b2$, in which the sublayers $30b1$ . . . $30b3$ have been replaced by a single layer with a matrix 11 in which several PCM materials are dispersed, for example $13a,13b,13c$, having different change-of-state temperatures. Favourably, the matrix may be elastomer-based and porous, to combine deformability and variation in conductivity depending on the solid or liquid state of the PCM(s).

Whatever the case may be, each PCM material (said first material) of the element $3b$ will thus have a temperature at change of state (between liquid and solid) less than or equal to the lowest temperature of said predetermined range (assumed here to be 25° C.), in order to, by means of change of state:

yield heat (or absorb so-called cold energy) by crystallising, thereby delaying propagation of cold from the external environment towards the internal volume 1, and absorb heat (or release stored cold energy) by liquefying under the influence of the heat produced by the heat-producing element 2, Furthermore, each second PCM material (said second material) of the elements $3a$ will have a change-of-state temperature greater than or equal to the highest temperature of said predetermined range (assumed here to be 35° C.), in order to, by means of change of state:

absorb heat energy by liquefying, thereby delaying propagation of heat energy from the external environment towards the internal volume 1, and release stored heat energy, by crystallising at a temperature less than or equal to the highest temperature of the predetermined range.

The barrier 3 will be favourably associated with the wall 6 of a casing 8 in which the cell pack 2 can be enclosed; refer to diagram in FIG. 2. In practice, the barrier 3 may line the wall 6 (plastic, composite or indeed metal) or be incorporated in the latter (by moulding for example).

In this application to thermal management of a battery, it should be understood that the thermal barrier 3 in FIG. 2 will actually completely encircle the volume 1. All sides of this volume will therefore be insulated from the exterior (EXT/4) by the layers of the barrier 3.

With the casing 8 and barrier 3 therefore mounted on a motor vehicle for example, several disruptive conditions will occur. Thus:

if the outside environment 4 experiences a temperature exceeding 35° C. (hot weather for example), there will be a tendency for the temperature in the volume 1 to rise, if the outside environment 4 experiences a temperature of less than 25° C., there will, conversely, be a tendency for this internal temperature to fall.

In order to distinguish these situations from the "reference" situation in which the battery operation provides optimum performance: in this case between 25° C. and 35° C., a thermal switch 50 has been arranged between the first $3a$ and second $3b$ PCM elements.

These may involve metallic plates (copper or aluminium for example), forming bimetallic strips, with shape memory material. For as long as the temperature of the layer $3a$ is less than 25° C., the thermal switch 50 is in non-passing mode, thereby isolating the layer $3a$ from the channels 55. When the temperature of the layer $3a$ exceeds 35° C. (upper temperature of the range), the thermal switch 50 is in passing mode, allowing contact between the layer $3a$ and the channels 55.

In order to perfect the first internal level of thermal management provided by the hot PCM element of layer $3a$, which in the example is liquefied beyond 35° C., the thermal barrier will favourably incorporate, between the thermal switch 50 and the second cold PCM element $3b$ (which is therefore crystallised below 25° C.)

both a space 53 crossed by fluid circulation channels 55, by flue effect, of (at least) one fluid F, and one of the layers, $5a$, of said fourth thermally insulating elements, indeed the innermost of said thermally insulating layers. It will be noted in FIG. 2 that another series of channels 55 divides the element $3b1$ into two parts, external $3b11$ and internal $3b12$ respectively, which may be of identical composition. A third series 55 also crosses another layer of PCM: that marked $3c$ from one side to the other in the same manner.

This forms three heat exchangers, marked 550,551 and 552 respectively in FIG. 2.

Indeed, such a (fourth) thermally insulating element will preferably be interposed successively between two sub-blocks $3b1,3b2$ of the cold PCM-based element (layer $5b$), between the elements based on cold PCM $3b$ and hot PCM 3c (layer 5c) and over the entire external periphery of the barrier 3, around the entire hot PCM-based element 3c (layer 5d).

Each series of channels 55 may adopt the form of an undulating fluid circulation plate with parallel undulations.

As regards construction in VIP pockets, in the same way that it will be applied favourably to all these thermally insulating layers 5a-5d, or even the layers based on cold PCM 3b and hot PCM 3c will also be incorporated therein for ease of manufacture, handling and implementation (see below), it will equally not be applied to the innermost layer 3a, based on hot PCM.

Indeed, this element or layer 3a is designed to come into contact with the cells of the battery and therefore be able to absorb at least some deformations that these cells undergo when they increase in temperature.

Furthermore, since it is liquefied above 35° C., the layer 3a will allow thermal absorption of any hot spots resulting from an isolated overheating of a cell.

As for the channels 55 for circulation of fluid, preferably a gas, such as air in particular, they will also be favourably found in the elements based on cold PCM 3b and hot PCM 3c, in order to facilitate their regeneration (liquefied state for the element 3b and crystallised state for the element 3c). Apart from the thermally insulating layers that will provide a staggered effect of thermal obstacles, it is therefore the respectively hot 3c and cold 3b PCM layers which, outside ambient temperature ranges of 25° C.=<TA=<35° C. et 25° C.=<TB=<35° C. will act in attempting to preserve this optimum operating temperature range of the battery.

Figure 3:
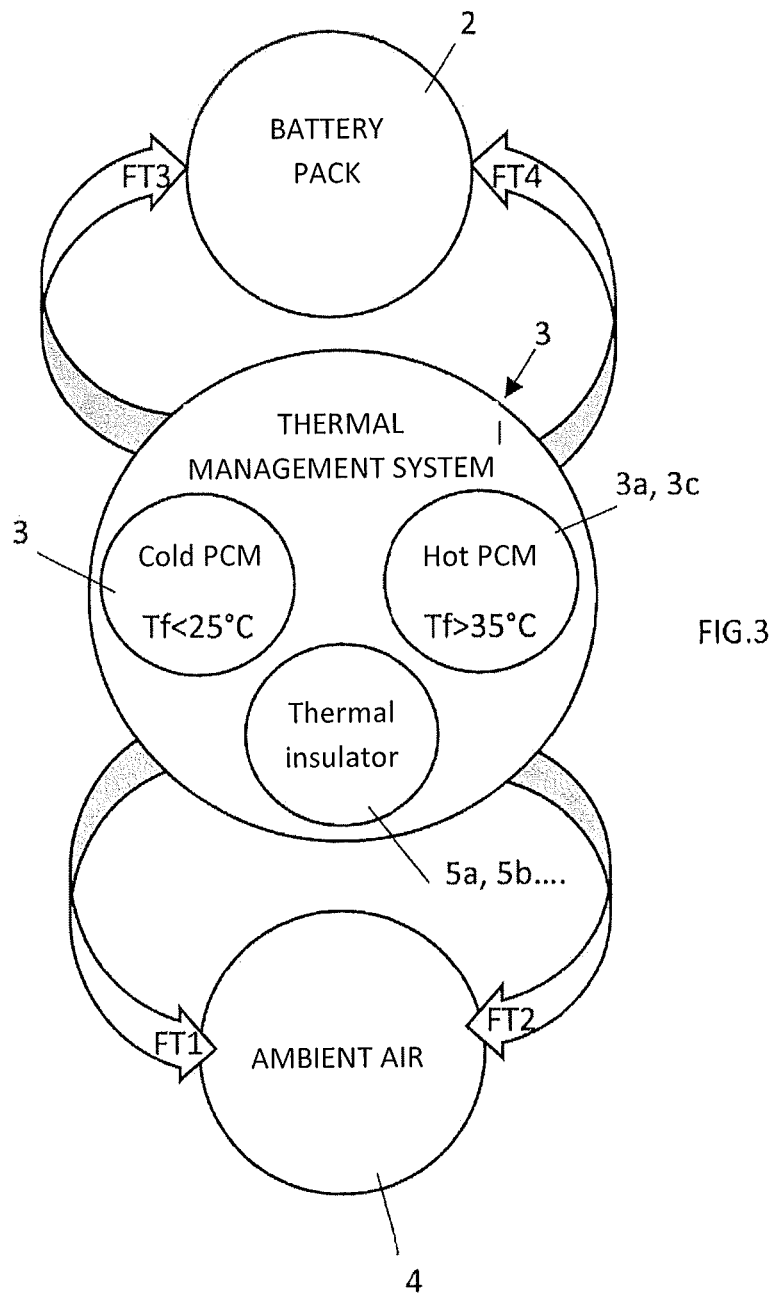
FIG. 3 outlines the functional exchanges associated with this thermal management.

If one now calls:
EB the operating status of the battery: ON (operating) or OFF (switched off),
TA, the variable temperature of the external environment (EXT/4), which can be considered as liable to change between −20° C. and 45° C.,
and TB the temperature of the cells 2, which is therefore assumed to be maintained between 25° C. and 35° C., the temperature that they exceed when they produce electricity and are not, as is the case here, under thermal management:
the main functions aimed at achieving this management and common to the thermally insulating and hot and cold PCM layers are the following (refer to diagram in FIG. 3):
FT1: for TA=<25° C. and battery in EB OFF status, limit the action of ambient cold on battery cooling,
FT2: for TA>=35° C., limit the action of ambient heat on battery heating,
FT3: for TB=<35° C., limit the heat from the battery or batteries (cells 2a, 2b . . . ) leaving towards the outside,
FT4: for TB>=35° C., evacuate the heat from the battery or batteries towards the outside.

As for the operating procedure, it can be defined as follows:
a) When 25° C.=<TA=<35° C. and 25° C.=<TB=<35° C. and EB is OFF:
The thermal switch 50 is non-passing and the barrier 3 is inactive. b) When TA<25° C. and TB tends towards 25° C. and EB is OFF:
The functions FT1 and FT3 are implemented. The thermal switch 50 is non-passing and the barrier 3 becomes active. The insulating layers 5d,5c . . . play their role successively, from the outside towards the inside. The cold PCM layers 3b2 followed by 3b1 crystallise when their temperature reaches=<25° C., which delays propagation of cold to the battery. The heat accumulated by the cells during their operation is maintained, since arrival of the cold front is delayed by the layers 3b2 and the losses are delayed by those 3b1 keep TB above the low range temperature =<25° C.

c) When TA>35° C. and TB tends towards 35° C. and EB is still OFF:
Function FT2 is implemented. The thermal switch 50 is still non-passing and the barrier 3 is active. The insulating layers 5d,5c play their role successively, from the outside towards the inside. The hot PCM layers 3c2 followed by 3c1 melt when their temperature reaches =>35° C., which delays propagation of heat to the battery by absorption of the heat energy.

d) When EB passes to ON, 25° C.=<TA=<35° C. and 25° C.=<TB=<35° C.: The thermal switch 50 is non-passing and the barrier 3 is inactive.

e) When EB is ON, 25° C.=<TA=<35° C. and TB tends towards 35° C.:
The function FT4 is implemented. Since a battery temperature of 35° C. is approached, the thermal switch 50 becomes passing via, in the example, the bimetallic strips which provide heat conduction. The barrier 3 becomes active. By providing natural convection means (fins and/or circulation of the fluid F in the channels 55, in particular those adjacent to the thermal switch 50), it is possible to maintain this temperature TB at around 35° C. It should be noted that the cold PCMs will liquefy again when the heat reaches the latter from the battery (hence in operation; EB ON).

f) When EB is ON, TA<25° C. and TB tends towards 35° C.:
The function FT4 is implemented. The situation is as above, with in addition the effect provided by the layers 3b and in particular 3b1, which are normally in a liquid state in this case owing to the heat transmitted by the battery. If TA<25° C., the hot PCMs are crystallised when the vehicle starts up; they can only liquefy if they are reached by heat from the battery or if the environment temperature (battery compartment) increases to more than 35° C. and will subsequently recrystallize on stopping owing to TA<25° C. g) When EB is ON, TA>35° C. and TB<35° C.:
It is assumed that at night, the outside temperature TA falls below 25° C. (the layers 3b2 only melt if they have been able to crystallise in this manner). Function FT2 is implemented. The thermal switch 50 is once again non-passing. The barrier 3 is active. The insulating layers 5d,5c play their role successively, from the outside towards the inside. The hot PCM layers 3c2 followed by 3c1 are melted. If the night has been cool (TA<35° C. and typically TA<25° C.), the layers have crystallised and will melt again as the warm air circulates.

h) When EB is ON, TA>35° C. and TB tends towards 35° C.:
Function FT2 is implemented again. The thermal switch 50 becomes passing. The barrier 3 is active. The insulating layers 5d,5c . . . play their role successively. As above, the cold PCM layers 3b2 and 3b1 melt when their temperature becomes >25° C. As expected, the aforementioned natural convection means once again contribute to the induced delay in the heat flow. If the night has been cool (TA<35° C. and typically TA<25° C.), the hot PCM layers 3c2 followed by 3c1 are crystallised and will melt again when the hot flow circulates.

i) When EB is ON, TA>35° C. and TB>35° C.:
The function FT4 is implemented. The thermal switch 50 is passing. The insulating layers 5d,5c still play their role successively. It is possible that at the level of the aforementioned means of natural convection, specifically the air required to pass through the channels 55, it is necessary to use air conditioning, at less than 25° C.

Concerning the exchange method, preferably by natural convection, provided by the fluid F circulating in the channels 55 within the layers of hot PCM 3*c* (flue 55*a*) and cold PCM 3*b*1, the following should again be noted:

Concerning the exchange method, preferably by natural convection, provided by the fluid F circulating in the channels or flue 55 within the layers of hot PCM 3*c* and cold PCM 3*b*1, the following should again be noted:

Let us first consider the situation in FIG. 7. The battery operates. It therefore generates heat. The example involves a battery with prismatic cells for an electric vehicle, therefore having 25 to 35° C. as the preferred temperature range to be maintained in the volume 1, in order to optimise their operation.

Scenario 1: It is assumed that after a long period of immobilisation, for example on a night when the temperature has dropped to 20° C., the electric vehicle 10, parked outside, restarts and runs, thus propelled by the energy produced by the battery 2. On the day before, the vehicle was exposed to an outside air temperature 4 (surrounding the barrier 3) above the aforementioned 25° C./35° C. range, for example 36° C. behind the bodywork.

The hot PCM(s), at least of the layer 3*c*, has/have been able to crystallise during the night (change-of-state temperature(s) of between 30° C. and 35° C., for example).

Outside air 4 can be introduced through the inlet duct 57 into the exchanger 552 to activate liquefaction of the hot PCM(s) of the layer 3*c*. The heat released is stored therein. Owing to this convective exchange, the air exits from the exchanger 552 colder than when it entered. The air is subsequently passed, through the connecting duct 59, into the second exchanger 551, which is surrounded by cold PCM (sublayers 3*b*11,3*b*12 having an assumed PCM change-of-state temperature of 25° C., for example).

With the night temperature having been 20° C., it will have been possible to store so-called cold energy in the PCM of the layer 3*b* now crystallised. When relatively warm air passes into the exchanger 551, this cold PCM will return to the liquid state by absorbing energy extracted from the circulating air. The temperature of the air circulating in the 551 exchanger decreases.

If the night temperature had not allowed this storage of cold energy, heating energy would have been converted solely in the form of specific energy and would have heated the cold PCM block to the air temperature. The reduction in the air temperature provided by the duct 59 would have been less effective and shorter.

The combination of passage of air into the hot PCM(s) (storage of heat energy in the layer 3*c*) and subsequently cold PCM(s) (reheating of the block 3*b*) has the effect of lowering the temperature of the exchange air supplied.

In practice, it will be possible to favourably define the choices of the PCMs and the dimensions of the hot and cold PCM(s) 3*c*,3*b* to provide a thermal service for an average time corresponding to an average use (<1 h) of the vehicle.

Such stand-alone conditioning of outside air with a temperature greater than the maximum temperature range for the battery 2 (35° C. in the example) will typically be of value, as it allows operation without the resorting to the thermodynamic system 61 for air conditioning (A/C) of the passenger compartment 71 with which vehicles are frequently equipped (FIG. 6).

For as long as the air conditioned by the ducts 57,59 has a temperature below the maximum temperature of the range to be maintained in the battery 2, heat transfer from the layer 3*b* to the exchanger 550 can be guaranteed.

The external heat exchanger 63, externally connected to the barrier 3 at the outlet of the exchanger 550 (duct 65) and which may be of air/air type, is inactive. The air passes successively into the three exchangers 552,551,550. Renewal is 100%. The air exiting from the exchanger 550 is discharged in 67 towards the outside 4, via the duct 65 (FIG. 5).

Scenario 2: Start-up of the vehicle 10 following brief immobilisation; vehicle used and subsequently immobile for 1 hour for example.

If the stand-alone conditioning via the barrier 3 still allows air to enter the exchanger 550 at a temperature lower than the maximum temperature of the range, scenario 1 applies as long as Te<35° C. in the exchanger 550.

If the situation no longer allows (Te>35° C.), the exchanger 63 is activated. A close circuit 69 of fluid is established, outside the barrier 3, between the exchangers 63 and 550, with the external heat exchanger 63 discharging the heat introduced into the exchanger 550 by the outside air derived from the inlet duct 57 (FIG. 5).

Scenario 3: Use beyond conditioning (Te≥35° C.); FIG. 6.

If the temperature conditions of the outside air remain close (to within 5° C.) to the liquefaction temperature of the hot PCM(s) of the layer 3*c* (30 to 35° C. in the example), scenario 2 applies, at least initially.

However, for outside air temperature conditions well above 35° C., the exchanger 63 may not be sufficient.

In this case, the exchanger 550 is supplied directly with air originating from the passenger compartment 71 of the vehicle or with air conditioned by the thermodynamic air conditioning system 61, via the fluid inlet duct 62.

At least the exchanger 63 is thus short-circuited. The exchangers 552,551 can still be supplied by the outside air inlet 57. The air temperature in and at the outlet from the second exchanger 551 is higher than the maximum temperature of the range in the battery 2 (35° C. in the example) and that at change of state of the hot PCM(s), at least of the layer 3*c*.

Scenario 4 (FIG. 7): It is assumed that the battery 2 is still operating and that the outside air temperature is <35° C., therefore lower than the maximum temperature of the range in the battery 2 and that at change of state of the hot PCM(s) of the layer 3*c*.

Outside air from the inlet duct 73 can then flow directly into the exchanger 550 to maintain the values within the temperature range. The same situation may prevail in the exchanger 552: Outside air from another inlet duct 75 can then flow directly through the latter to maintain the values within the favourable temperature range.

For outside air >25° C. and <35° C., air circulation originating from the passenger compartment thermodynamic air conditioning system 61 is provided in the exchanger 551, via a dedicated duct 77, if the outside air temperature 4 has not fallen below 25° C. overnight.

During use of the battery 2, if the outside air temperature increases to above 35° C., scenario 3 may be activated.

For an outside air temperature <25° C., circulation in the exchanger 551, via a dedicated outside air inlet 79, is activated directly.

As long as the outside air temperature is <35° C., circulation of this air in the exchanger 550 can be allowed. When the outside temperature becomes >35° C., scenario 3 can be activated.

If, during the day, the air temperature has been higher than 35° C., the hot PCM(s) of the layer or block 3*c* have been liquefied to allow cooling of this hot air during its circulation through the exchanger 552, via the inlet duct 75. Also, if for example the outside air has fallen to a temperature <35° C. overnight, its intake into the exchanger 552 at the beginning of the day will allow crystallisation in this block 3c. If, on the other hand, during the night and the following day, the outside temperature does not fall below 35° C., this crystallisation in this block 3c will be able to be carried out with the aid of the thermodynamic system 61 for air conditioning the passenger compartment, via air circulation in an additional outside duct 81.

Scenario 5: The battery 2 operates. The outside air temperature 4 is assumed to be <20° C. all day and all night.

Figure 8:
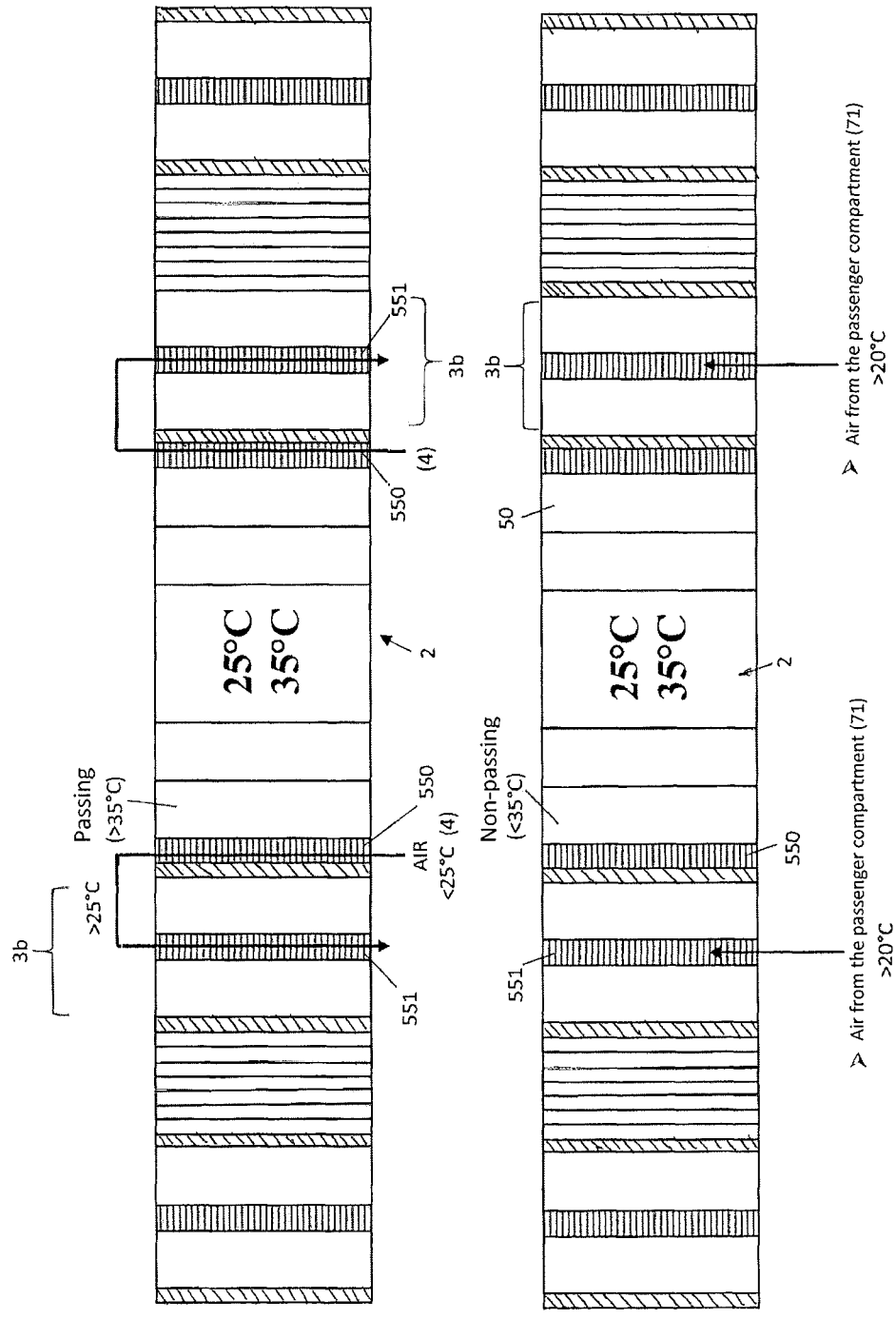

The cold PCM(s) of the layer or block 3b is/are crystallised. It/they therefore need to be liquefied for reactivation to render it/them functional during subsequent immobilisation. The first option is to use the heat production from the battery which will allow all the cold PCM blocks to increase in temperature above 25° C. (liquid state). This will only work however if the battery temperature increases to above 35° C. and therefore requires cooling. The air, coming from outside 4, at a temperature <20° C. and introduced into the exchanger 550 will heat up and can be used in the exchanger 551 to heat the blocks 3b (FIG. 8, top diagram). If after a certain time (10 minutes for example), circulation in the exchanger 550 is still not activated, the exchanger 551 will be supplied by an air intake on the passenger compartment 71 which, owing to the heating, will allow circulation of air at more than 25° C. and thus liquefaction of the blocks 3b (FIG. 8, bottom diagram).

Turning to creation of the barrier 3, inspiration can be taken from the embodiments in FIGS. 9 and 10 for packing in VIP pockets 7 or 70 of all or some of the elements 3a-3c and 5a-5d.

Thus, in FIG. 9, grouping in the example of the insulating layer 5b and the PCM material elements respectively 3b11 and 3b2 located on both sides is performed inside a single enclosure 9, under a partial vacuum. The enclosure 9 can be obtained based on two sealed sheets 11a,11b. Each sheet can be deformable, impermeable to gas, for example made of plastic and/or roll-formed aluminium with a thickness of a few tens of micrometres, or metallised, with for example a vacuum deposit with a thickness of a few tens of nanometres. The sheets 11a,11b will typically be peripherally sealed, welded for example, in 13. This will facilitate common moulding with the wall 6, if this is desired. The areas 13 can serve as a flexible mechanical connection, hinged between two successive pockets 7. Based on FIGS. 9,10, one can readily conceive of a line or strip of successive pockets 7,70 connected in pairs by these flexible mechanical connections 11. This will allow creation of angles and corners, etc. . . . .

In the second embodiment (FIG. 10), the VIP pocket 70 comprises a vacuum enclosure, double (9a,9b). At least the inner enclosure 9a containing the thermal insulator, in this case 5b, is impermeable to gases and under a partial air vacuum. The external enclosure 9b, which contains the inner enclosure 9a and the PCM material elements, in this case 3b11 and 3b2, may merely have a function of joining and cohesion. Its constituent sheets may be made of non-impermeable material. Consequently, the enclosure 9b may not be under vacuum internally.

With regard to the hot and cold PCM elements respectively, for two types of batteries for example, operating favourably at between 25° C. and 35° C. and between 45° C. and 55° C. (all to within 15%), it will in particular be possible to use encapsulated PCMs (typically microencapsulated) in a porous, open-pore matrix, preferably of the elastomer type, such as based on NBR and HNBR silicone.

It should also be noted that any PCM may have a phase or state change at a predetermined temperature peak or over a more or less wide temperature range. Thus, with a pure PCM (such as a paraffin) the change-of-state temperature will be constant, whereas it may not be constant with several PCMs, such as for a mixture of paraffins.

Generally speaking, since both cases can be encountered in this application in conjunction with the PCMs provided for, any PCM change-of-state temperature will be considered here within a range of 10° C., and typically +/−5° C.

The invention claimed is:

1. An assembly comprising a thermal management device to maintain, with respect to electric battery cells, a temperature of an internal volume of the thermal management device within a predetermined range, wherein the assembly further comprises:
    said internal volume and a battery cell unit comprising all of said electric battery cells, the battery cell unit being arranged in said internal volume,
    the thermal management device being arranged around the internal volume and the battery cell unit, and said thermal management device being placed in an outside environment, wherein the thermal management device comprises:
    at least one thermally insulating element interposed between the internal volume and the outside environment,
    at least one PCM element including a PCM having a change of state temperature,
    at least one circulation channel passing along said at least one PCM element, and configured such that a fluid passes therethrough at a temperature higher than said change of state temperature, in thermal exchange with said PCM, and
    a source of said fluid source which is connected to said at least one circulation channel, so that said fluid passing in the at least one circulation channel provides heat to said PCM at a temperature higher than said change of state temperature.

2. The assembly according to claim 1, wherein said at least one thermally insulating element is disposed between said at least one PCM element and the outside environment.

3. The assembly according to claim 1, further comprising a thermal switch arranged between the at least one PCM element and the at least one circulation channel.

4. The assembly according to claim 1, wherein said predetermined temperature range to be maintained is between 25° C. and 35° C., to within 5° C.

5. The assembly according to claim 1, wherein the PCM included in the at least one PCM element comprises a plurality of said PCMs, including:
    at least one first PCM, and
    at least one second PCM having a change-of-state temperature different from the at least one first PCM.

6. The assembly according to claim 5, wherein said first PCM and/or said second PCMs individually comprise several PCM having change-of-state temperatures different from one another.

7. The assembly according to claim 5, wherein
    said at least one first PCM comprises a group of first PCMs,
    said at least one first PCM and said at least one second PCM are included, from the inside,
    where said internal volume is located, towards the outside where the outside environment is located, in:

an element containing several PCMS of said group of first PCMs, and another element containing said at least one second PCM.

8. The assembly according to claim 5, further comprising:

a closed loop circuit, located in said outside environment and in which said fluid is configured to circulate between a fluid output of the at least one circulation channel and a fluid input of the at least one circulation channel, and, a heat exchanger disposed on said closed loop circuit and in which said fluid is configured to discharge heat collected from at least one of the first and second PCMs.

9. The assembly according to claim 1, wherein the at least one PCM element comprises a porous matrix in which said PCM is contained, the porous matrix having open pores.

10. The assembly according to claim 1, wherein the at least one PCM element defines a layer of material which surrounds and peripherally delimits the at least one circulation channel which passes therealong.

11. An assembly comprising an internal volume, electric battery cells arranged in the internal volume, and a thermal management device in order to encourage, within the internal volume, with respect to the electric battery cells, a temperature within a predetermined range, wherein the thermal management device is arranged around the internal volume and placed in an outside environment, and wherein the thermal management device comprises:

a fluid, a thermally insulating element interposed between the internal volume and the outside environment, at least one PCM element including a PCM having a change of state temperature, at least one circulation channel passing along said at least one PCM element, and configured such that the fluid circulates therein and in indirect thermal exchange with said PCM to collect heat therefrom, the at least one PCM element comprising a matrix in which said PCM is contained, a closed loop circuit located in said outside environment and in which said fluid circulates also, between a fluid output of the at least one circulation channel and a fluid input of the at least one circulation channel, and, a heat exchanger disposed on said closed loop circuit and in which said fluid discharges heat collected from the PCM, and then is recirculated in said closed loop circuit to the fluid input of the at least one circulation channel.

12. The assembly according to claim 11, wherein the at least one PCM element defines a deformable layer adapted to absorb deformation of the electric battery cells and thermally absorb hot spots which they may have caused.

13. The assembly according to claim 11, wherein the thermally insulating element is interposed between the at least one PCM element and the outside environment.

14. The assembly according to claim 11, wherein the at least one PCM element defines a layer of material which surrounds and peripherally delimits the at least one circulation channel which passes therealong.

15. An assembly comprising an internal volume, electric battery cells arranged in the internal volume, and a thermal management device in order to encourage, within the internal volume, with respect to the electric battery cells, a temperature within a predetermined range, wherein the thermal management device is arranged around the internal volume and the electric battery cells, said thermal management device being placed in an outside environment, and wherein the thermal management device comprises:

at least one thermally insulating element interposed between the internal volume and the outside environment, at least one PCM element including a PCM, at least one circulation channel passing along said at least one PCM element, and configured such that a fluid passes therethrough in thermal exchange with the PCM, the at least one PCM element comprising a matrix in which said PCM is contained, so that said thermal exchange with the PCM be indirect, and, a source of said fluid, the fluid source being connected to said at least one circulation channel.

16. The assembly according to claim 15, wherein the matrix is a solid matrix.

17. The assembly according to claim 15, wherein the matrix is an elastomeric matrix.

18. The assembly according to claim 15, wherein the at least one PCM element defines a layer of material which surrounds and peripherally delimits the at least one circulation channel which passes therealong.

* * * * *